July 14, 1970    H. T. HILL ET AL    3,520,234

PISTONS

Filed Sept. 13, 1968    2 Sheets-Sheet 1

Inventor
H. T. HILL
D. A. LAW
By Holcombe, Wetherill & Brisebois
Attorneys

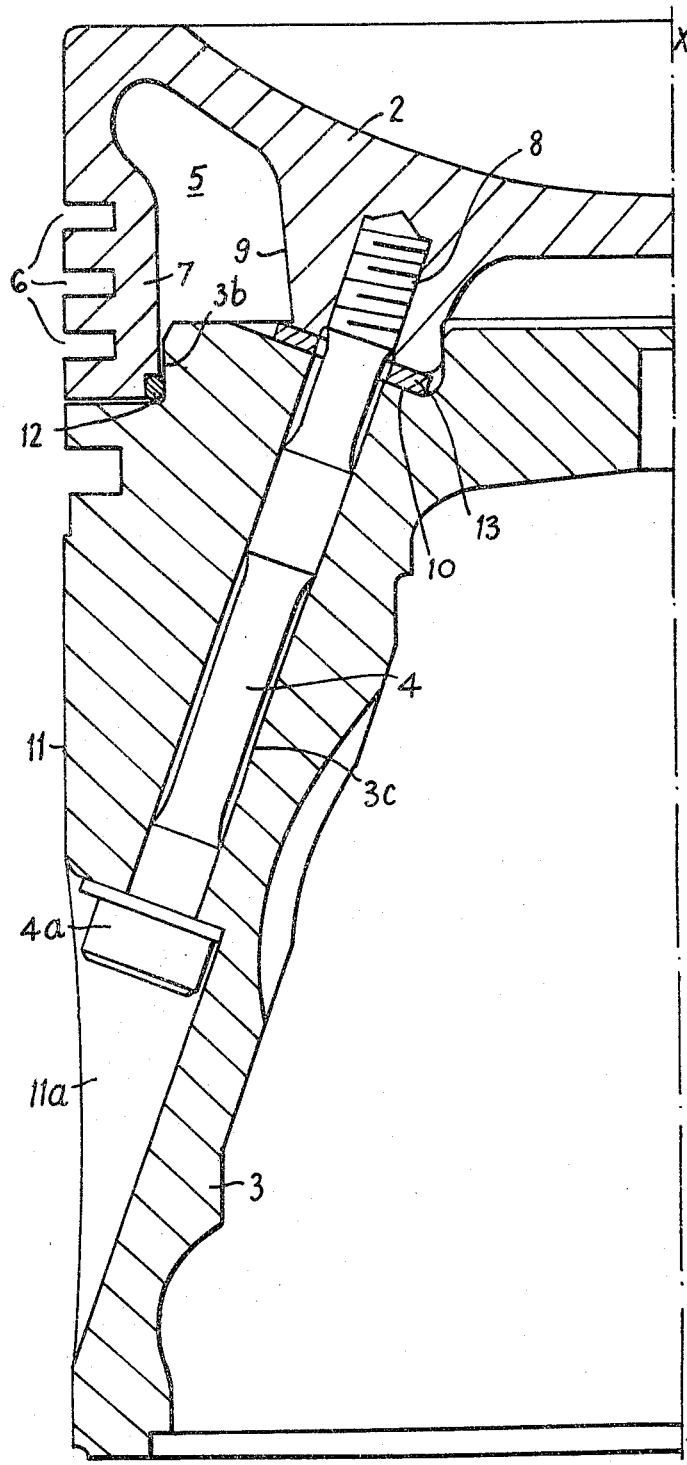

United States Patent Office

3,520,234
Patented July 14, 1970

3,520,234
PISTONS
Harold T. Hill and Douglas A. Law, Lymington, England, assignors to Wellworthy Limited, Lymington, Hampshire, England, a British company
Filed Sept. 13, 1968, Ser. No. 759,737
Claims priority, application Great Britain, Sept. 28, 1967, 44,304/67
Int. Cl. F16j 1/64
U.S. Cl. 92—220                                                8 Claims

ABSTRACT OF THE DISCLOSURE

This invention relates to a two-piece piston construction wherein the piston crown is secured to the piston body by means of bolts extending through the body into the underside of the crown and the bolts are inclined with respect to the longitudinal axis of the piston.

---

The present invention relates to pistons and more particularly to two-piece pistons having a main body and a separate crown.

The piston crown may be made from a ferrous material or a heat resistant alloy, whilst to reduce piston weight, the body may be made of aluminium alloy.

One method of securing the body to the crown involves the use of bolts which are passed through the crown into the top of the piston body and, in order to prevent any blast erosion occurring during combustion, the bolt heads are shrouded. However, such a construction causes the bolts to be in a state of tension under certain operating conditions.

An alternative proposal is to secure the body to the crown by means of bolts which extend parallel to the longitudinal axis of the piston from the underside of the body of the piston into blind threaded holes disposed on the underside of the piston crown. However, with certain designs of piston body, because of the inaccessibility of the underside of the crown, it is not possible to incorporate bolts in this way. Such piston bodies are particularly those designed to operate at high cylinder pressures, for example maximum firing pressure in the order of 1,500 p.s.i. (100 kg./cm.$^2$).

According to the present invention a piston crown is secured to a piston body by means of bolts extending through the body into the underside of the crown and inclined with respect to the longitudinal axis of the piston.

In one embodiment the heads of the bolts may be located adjacent the base of the piston body.

In a further embodiment the heads of the bolts may be located adjacent the side walls or skirt of the piston body. In order to avoid the gudgeon pin bosses in the piston body, the bolts may be so inclined that they engage in blind holes in the crown towards the axis of the piston.

Figure 1:
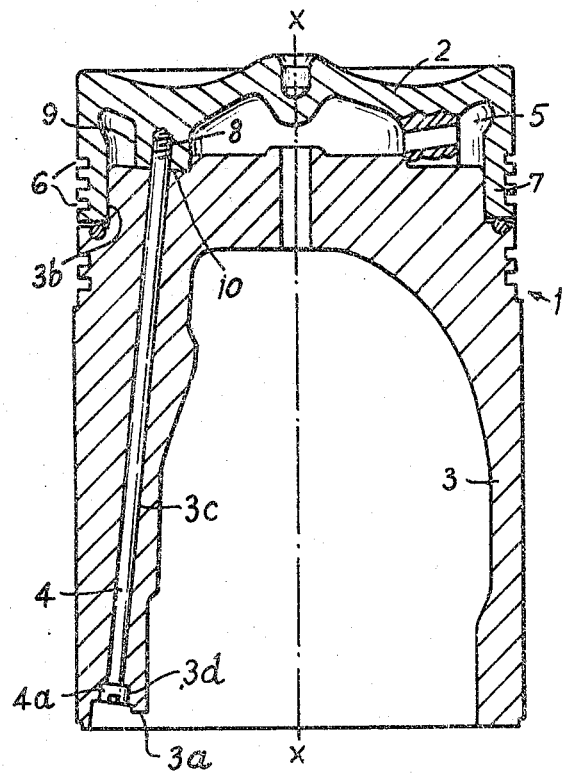
Figure 2:
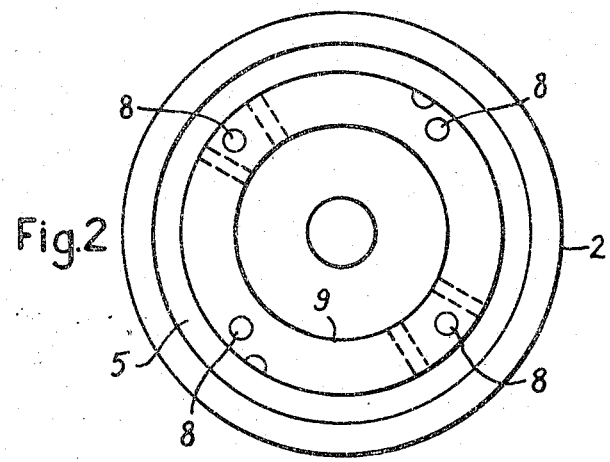

The invention will now be further described by way of example, with reference to the accompanying drawings in which:

FIG. 1 is a cross-sectional view of one embodiment of a two-piece piston assembly, FIG. 2 is a plan view of the underside of the crown, and FIG. 3 is a partial cross-sectional view of a further embodiment.

Referring to FIG. 1, a two-part piston assembly, generally indicated at 1, has a crown 2 secured to a body 3 by means of a plurality of bolts, one of which is shown at 4. The bolts 4 are inserted from adjacent the base 3a of the piston body 3 and are located in bores 3c which are inclined inwardly towards the crown with respect to the longitudinal axis X—X of the piston. The head 4a of each bolt is located in a recess 3d adjacent the base of the piston body and the threaded portion engages in a blind threaded hole 8 formed in the annular boss 9 on the underside of the crown.

The crown 2 incorporates a cooling cavity 5 which is disposed adjacent the top land and partially behind the piston ring grooves 6 provided in the skirt 7 of the crown. The lower edge of the skirt 7 co-operates with a shoulder 3b on the body, so registering and aligning the crown 2 with the piston body 3. It will be noted that the interface 10 between the crown 2 and body 3 in the region of the bolts is at 90° to the longitudinal axis of the bolt.

As shown in FIG. 2, four bolts are provided, each of which engages in its corresponding blind threaded hole 8 formed in the annular boss 9 on the underside of the crown.

By inclining the bolts 4 to the piston axis X—X, the holes incorporated in the crown 2 can be positioned towards the central axis of the piston. In this way the provision of the bolts does not necessitate or cause any obstruction of the cooling cavity 5.

Referring now to the embodiment of FIG. 3, wherein corresponding parts bear the same references as in FIGS. 1 and 2, the bolts 4 are so inclined that their heads 4a are located in recesses 11a in the side walls or skirt 11 of the piston body 3. In this embodiment, spacer rings 12 and 13 are also provided between the mating faces of the piston body 3 and crown 2 in order to reduce the effect of rubbing or fretting between the mating faces at the interface 10 and shoulder 3b due to the differences in the rate of expansion or contraction of the body 3 and crown 2 when the piston is in operation in a cylinder.

It will be appreciated that various modifications may be made without departing from the scope of this invention. Thus the number of bolts provided may be greater or less than the four shown.

We claim:

1. A two-piece piston comprising a piston body and a separate crown and having the piston crown secured to the piston body by means of bolts extending through the body into the underside of the crown, wherein the bolts are inclined with respect to the longitudinal axis of the piston.

2. A piston as claimed in claim 1, wherein the bolts extend from adjacent the base of the piston body into blind holes in the underside of the piston crown.

3. A piston as claimed in claim 2, wherein the heads of the bolts are located in recesses adjacent the base of the piston body.

4. A piston as claimed in claim 1, wherein the bolts extend from the side walls or skirt of the piston body into blind holes in the underside of the piston crown.

5. A piston as claimed in claim 4, wherein the heads of the bolts are located in recesses in the side walls or skirt of the piston body.

6. A piston as claimed in claim 1, wherein the interface between the piston crown and the piston body in the region of the bolts is at 90° to the longitudinal axis of the bolts.

7. A piston as claimed in claim 1, wherein a cooling cavity is disposed behind the piston ring grooves and wherein the threaded ends of the bolts are located in an annular boss between the cooling cavity and the longitudinal axis of the piston.

8. A piston as claimed in claim 1, wherein one or more spaced members are located between mating faces of the piston body and the piston crown.

References Cited

UNITED STATES PATENTS 2,321,054  6/1943  Vostrez _____ 92—220

R. BUNEVICH, Assistant Examiner

MARTIN P. SCHWADRON, Primary Examiner